United States Patent
Zhou

(10) Patent No.: US 10,686,701 B2
(45) Date of Patent: Jun. 16, 2020

(54) PACKET TRANSMISSION METHOD AND DEVICE, AND COMMUNICATIONS SYSTEM

(71) Applicant: HUAWEI TECHNOLOGIES CO., LTD., Shenzhen, Guangdong (CN)

(72) Inventor: Wei Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 548 days.

(21) Appl. No.: 15/298,449

(22) Filed: Oct. 20, 2016

(65) Prior Publication Data

US 2017/0041227 A1 Feb. 9, 2017

Related U.S. Application Data

(63) Continuation of application No. PCT/CN2014/075840, filed on Apr. 21, 2014.

(51) Int. Cl.
*H04W 88/04* (2009.01)
*H04L 12/741* (2013.01)
(Continued)

(52) U.S. Cl.
CPC .......... *H04L 45/74* (2013.01); *H04L 61/2007* (2013.01); *H04L 61/6022* (2013.01);
(Continued)

(58) Field of Classification Search
CPC . H04L 45/74; H04L 61/2007; H04L 61/6022; H04W 40/02; H04W 80/04; H04W 88/16
See application file for complete search history.

(56) References Cited

U.S. PATENT DOCUMENTS 8,432,871 B1 * 4/2013 Sarnaik ................. H04W 76/12
370/331
2008/0019387 A1 1/2008 Kim et al.
(Continued)

FOREIGN PATENT DOCUMENTS

CN 101114975 1/2008
CN 103026669 4/2013
(Continued)

OTHER PUBLICATIONS

International Search Report, dated Jan. 27, 2015, in International Application No. PCT/CN2014/075840 (5 pp.).
(Continued)

*Primary Examiner* — Brandon M Renner
(74) *Attorney, Agent, or Firm* — Leydig, Voit & Mayer, Ltd.

(57) ABSTRACT

The present invention discloses a packet transmission method, which relate to the communications field and can increase, in an environment of a mobile core network in which a forwarding plane is separated from a control plane, a success rate of packet transmission from the mobile core network to an external network. The method includes: determining an external gateway to which a data packet needs to be sent; obtaining a MAC address of the external gateway by using a forwarding plane apparatus; and sending a processing rule to the forwarding plane apparatus, so that the forwarding plane apparatus processes the data packet according to the processing rule, where the processing rule includes the MAC address and is used for instructing to send the data packet to the external gateway, and the external gateway is located in an external network connected to a core network.

5 Claims, 9 Drawing Sheets

(51) Int. Cl.
  *H04L 29/12* (2006.01)
  *H04W 40/02* (2009.01)
  *H04W 88/16* (2009.01)
  *H04W 80/04* (2009.01)

(52) U.S. Cl.
  CPC ............ *H04W 40/02* (2013.01); *H04W 80/04* (2013.01); *H04W 88/16* (2013.01)

(56) References Cited

U.S. PATENT DOCUMENTS

| | | | |
|---|---|---|---|
| 2013/0034104 A1 | 2/2013 | Yedavalli et al. | |
| 2013/0148667 A1 | 6/2013 | Hama et al. | |
| 2013/0170354 A1 | 7/2013 | Takashima et al. | |
| 2013/0250951 A1* | 9/2013 | Koganti | H04L 49/356 370/390 |
| 2013/0279371 A1 | 10/2013 | Takashima et al. | |
| 2015/0016300 A1* | 1/2015 | Devireddy | H04L 41/0893 370/254 |
| 2015/0043576 A1* | 2/2015 | Dixon | H04L 12/184 370/390 |
| 2015/0071053 A1 | 3/2015 | Kempf et al. | |
| 2015/0146718 A1* | 5/2015 | Wang | H04L 45/38 370/389 |

FOREIGN PATENT DOCUMENTS

| | | | |
|---|---|---|---|
| CN | 103081418 | 5/2013 | |
| CN | 103329488 | 9/2013 | |
| CN | 103548376 A | 1/2014 | |
| EP | 2615782 | 7/2013 | |
| EP | 2665229 | 11/2013 | |
| WO | WO-2014019205 A1 * | 2/2014 | ............ H04L 45/38 |

OTHER PUBLICATIONS

Written Opinion of the International Searching Authority, dated Jan. 27, 2015, in International Application No. PCT/CN2014/075840 (9 pp.).

Extended European Search Report, dated Mar. 22, 2017, in European Application No. 14890245.5 (7 pp.).

Chinese Office Action dated Jun. 4, 2018, in corresponding Chinese Patent Application No. 201480001660.X, 8 pgs.

International Search Report dated Jan. 27, 2015 in corresponding International Application No. PCT/CN2014/075840.

* cited by examiner

PACKET TRANSMISSION METHOD AND DEVICE, AND COMMUNICATIONS SYSTEM

CROSS-REFERENCE TO RELATED APPLICATIONS

This application is a continuation of International Application No. PCT/CN2014/075840, filed on Apr. 21, 2014, the disclosure of which is hereby incorporated by reference in its entirety.

TECHNICAL FIELD

The present invention relates to the communications field, and in particular, to a packet transmission method and device, and a communications system.

BACKGROUND

Currently, with rapid expansion of the Internet in scale, an existing routing system is excessively unwieldy and has relatively poor controllability. Therefore, a new network architecture idea is required to maintain sustainable development of the Internet. In view of this, the OpenFlow technology emerges accordingly. The OpenFlow technology is a set of exchange standards supporting an open interface and multi-layer control. In the OpenFlow technology, based on an existing Transmission Control Protocol/Internet Protocol (TCP/IP) technology, a data packet forwarding process that is originally controlled by a traditional switch/router is transformed into independent processes that are separately completed by an OpenFlow switch (referred to as a switch) and an OpenFlow controller (referred to as a controller) that support the OpenFlow technology, which implements separation of a forwarding plane and a control plane.

Currently, it has become a trend to apply the OpenFlow technology to a mobile core network. However, after the OpenFlow technology is applied to the mobile core network, a packet transmission may fail when a packet is transmitted from the mobile core network to an external network.

SUMMARY

Embodiments of the present invention provide a packet transmission method and device, and a communications system, which can increase, in an environment of a mobile core network in which a forwarding plane is separated from a control plane, a success rate of packet transmission from the mobile core network to an external network.

To achieve the foregoing objective, the following technical solutions are used in the embodiments of the present invention:

According to a first aspect, a communications system is provided and includes a forwarding plane apparatus and a gateway control plane apparatus that are located in a core network, where:

the gateway control plane apparatus is configured to determine an external gateway to which a data packet needs to be sent, obtain a MAC address of the external gateway by using the forwarding plane apparatus, and send a processing rule to the forwarding plane apparatus, where the processing rule includes the MAC address and is used for instructing to send the data packet to the external gateway, and the external gateway is located in an external network connected to the core network; and the forwarding plane apparatus is configured to obtain the MAC address of the external gateway for the gateway control plane apparatus and process the data packet according to the processing rule.

According to the first aspect, in a first possible implementation manner, the forwarding plane apparatus is further configured to receive a general packet radio service tunneling protocol (GTP) packet, where the GTP packet includes the data packet, and send the GTP packet to the gateway control plane apparatus; and the gateway control plane apparatus is further configured to decapsulate the GTP packet to obtain the data packet.

According to the first possible implementation manner, in a second possible implementation manner, the processing rule is further used for instructing to decapsulate the GTP packet; and the forwarding plane apparatus is further configured to decapsulate the GTP packet according to the processing rule, so as to obtain the data packet.

With reference to the first aspect, the first possible implementation manner, or the second possible implementation manner, in a third possible implementation manner, the gateway control plane apparatus is configured to determine, according to a mapping relationship between a destination IP address of the data packet and an IP address of the external gateway, the external gateway to which the data packet needs to be sent.

With reference to the first aspect, or any implementation manner of the first to the third possible implementation manners, in a fourth possible implementation manner, the gateway control plane apparatus is configured to send a MAC address request to the forwarding plane apparatus, so that the forwarding plane apparatus broadcasts the MAC address request, where the MAC address request includes an IP address of the external gateway and is used for requesting to obtain the MAC address of the external gateway; and the forwarding plane apparatus is configured to broadcast the MAC address request, receive a MAC address request response sent by the external gateway, and send the MAC address request response to the gateway control plane apparatus, where the MAC address request response includes the MAC address of the external gateway.

With reference to the first aspect, or any implementation manner of the first to the fourth possible implementation manners, in a fifth possible implementation manner, the gateway control plane apparatus is further configured to cache the MAC address of the external gateway.

According to a second aspect, a gateway control plane apparatus is provided and includes:

a determining unit, configured to determine an external gateway to which a data packet needs to be sent;

an obtaining unit, configured to obtain, by using a forwarding plane apparatus, a MAC address of the external gateway determined by the determining unit; and a sending unit, configured to send a processing rule to the forwarding plane apparatus, so that the forwarding plane apparatus processes the data packet according to the processing rule, where the processing rule includes the MAC address and is used for instructing to send the data packet to the external gateway, and the external gateway is located in an external network connected to the core network.

According to the second aspect, in a first possible implementation manner, the gateway control plane apparatus further includes:

a receiving unit, configured to receive a general packet radio service tunneling protocol (GTP) packet sent by the forwarding plane apparatus, where the GTP packet includes the data packet; and a decapsulation unit, configured to decapsulate the GTP packet to obtain the data packet.

According to the second aspect, in a second possible implementation manner, the determining unit is configured to:

determine, according to a mapping relationship between a destination IP address of the data packet and an IP address of the external gateway, the external gateway to which the data packet needs to be sent.

With reference to the second aspect or the first possible implementation manner or the second possible implementation manner, in a third possible implementation manner, the obtaining unit includes:

a sending module, configured to send a MAC address request to the forwarding plane apparatus, so that the forwarding plane apparatus broadcasts the MAC address request, where the MAC address request includes an IP address of the external gateway and is used for requesting to obtain the MAC address of the external gateway; and a receiving module, configured to receive a MAC address request response sent by the forwarding plane apparatus, where the MAC address request response includes the MAC address of the external gateway.

With reference to the second aspect or any implementation manner of the first to the third possible implementation manners, in a fourth possible implementation manner, the gateway control plane apparatus further includes:

a cache unit, configured to cache the MAC address that is of the external gateway and obtained by the obtaining unit.

According to a third aspect, a forwarding plane apparatus is provided and includes:

an obtaining unit, configured to obtain a MAC address of an external gateway that is determined by a gateway control plane apparatus and to which a data packet needs to be sent;

a first receiving unit, configured to receive a processing rule sent by the gateway control plane apparatus, where the processing rule includes the MAC address and is used for instructing to send the data packet to the external gateway, and the external gateway is located in an external network connected to the core network; and a processing unit, configured to process the data packet according to the processing rule received by the first receiving unit.

According to the third aspect, in a first possible implementation manner, the forwarding plane apparatus further includes:

a second receiving unit, configured to receive a general packet radio service tunneling protocol (GTP) packet, where the GTP packet includes the data packet; and a sending unit, configured to send the GTP packet received by the second receiving unit to the gateway control plane apparatus, so that the gateway control plane apparatus decapsulates the GTP packet to obtain the data packet.

According to the first possible implementation manner, in a second possible implementation manner, the processing rule is further used for instructing to decapsulate the GTP packet; and the forwarding plane apparatus further includes a decapsulation unit, configured to decapsulate the GTP packet according to the processing rule received by the first receiving unit, so as to obtain the data packet.

With reference to the third aspect or the first possible implementation manner or the second possible implementation manner, in a third possible implementation manner, the obtaining unit includes:

a receiving module, configured to receive a MAC address request sent by the gateway control plane apparatus, where the MAC address request includes an IP address of the external gateway and is used for requesting to obtain the MAC address of the external gateway;

a broadcast module, configured to broadcast the MAC address request received by the receiving module; and a forwarding module, configured to receive a MAC address request response sent by the external gateway, and send the MAC address request response to the gateway control plane apparatus, where the MAC address request response includes the MAC address of the external gateway.

According to a fourth aspect, a packet transmission method is provided and includes:

determining an external gateway to which a data packet needs to be sent;

obtaining a MAC address of the external gateway by using a forwarding plane apparatus; and sending a processing rule to the forwarding plane apparatus, so that the forwarding plane apparatus processes the data packet according to the processing rule, where the processing rule includes the MAC address and is used for instructing to send the data packet to the external gateway, and the external gateway is located in an external network connected to the core network.

According to the fourth aspect, in a first possible implementation manner, before the determining an external gateway to which a data packet needs to be sent, the method further includes:

receiving a general packet radio service tunneling protocol (GTP) packet sent by the forwarding plane apparatus, where the GTP packet includes the data packet; and decapsulating the GTP packet to obtain the data packet.

According to the fourth aspect, in a second possible implementation manner, the determining an external gateway to which a data packet needs to be sent includes:

determining, according to a mapping relationship between a destination IP address of the data packet and an IP address of the external gateway, the external gateway to which the data packet needs to be sent.

With reference to the fourth aspect or the first possible implementation manner or the second possible implementation manner, in a third possible implementation manner, the obtaining a MAC address of the external gateway by using a forwarding plane apparatus includes:

sending a MAC address request to the forwarding plane apparatus, so that the forwarding plane apparatus broadcasts the MAC address request, where the MAC address request includes an IP address of the external gateway and is used for requesting to obtain the MAC address of the external gateway; and receiving a MAC address request response sent by the forwarding plane apparatus, where the MAC address request response includes the MAC address of the external gateway.

With reference to the fourth aspect, or any implementation manner of the first to the third possible implementation manners, in a fourth possible implementation manner, after the obtaining a MAC address of the external gateway by using a forwarding plane apparatus, the method further includes:

caching the MAC address of the external gateway.

According to a fifth aspect, a packet transmission method is provided and includes:

obtaining a MAC address of an external gateway that is determined by a gateway control plane apparatus and to which a data packet needs to be sent;

receiving a processing rule sent by the gateway control plane apparatus, where the processing rule includes the MAC address and is used for instructing to send the data packet to the external gateway, and the external gateway is located in an external network connected to the core network; and processing the data packet according to the processing rule.

According to the fifth aspect, in a first possible implementation manner, before the obtaining a MAC address of an external gateway that is determined by a gateway control plane apparatus and to which a data packet needs to be sent, the method further includes:

receiving a general packet radio service tunneling protocol (GTP) packet, where the GTP packet includes the data packet; and sending the GTP packet to the gateway control plane apparatus, so that the gateway control plane apparatus decapsulates the GTP packet to obtain the data packet.

According to the first possible implementation manner, in a second possible implementation manner, the processing rule is further used for instructing to decapsulate the GTP packet; and the method further includes: decapsulating the GTP packet according to the processing rule, so as to obtain the data packet.

With reference to the fifth aspect or the first possible implementation manner or the second possible implementation manner, in a third possible implementation manner, the obtaining a MAC address of an external gateway that is determined by a gateway control plane apparatus and to which a data packet needs to be sent includes:

receiving a MAC address request sent by the gateway control plane apparatus, where the MAC address request includes an IP address of the external gateway and is used for requesting to obtain the MAC address of the external gateway; and broadcasting the MAC address request, receiving a MAC address request response sent by the external gateway, and sending the MAC address request response to the gateway control plane apparatus, where the MAC address request response includes the MAC address of the external gateway.

According to a sixth aspect, a gateway control plane device is provided and includes:

a communications unit, configured to communicate with an external device;

a processor, configured to determine an external gateway to which a data packet needs to be sent, and configured to obtain a MAC address of the external gateway by using a forwarding plane device; and a transmitter, configured to send a processing rule to the forwarding plane device by using the communications unit, so that the forwarding plane device processes the data packet according to the processing rule, where the processing rule includes the MAC address and is used for instructing to send the data packet to the external gateway, and the external gateway is located in an external network connected to the core network.

According to the sixth aspect, in a first possible implementation manner, the gateway control plane device further includes:

a receiver, configured to receive, by using the communications unit, a general packet radio service tunneling protocol (GTP) packet sent by the forwarding plane device, where the GTP packet includes the data packet; and the processor is further configured to: after the receiver receives the GTP packet sent by the forwarding plane device, decapsulate the GTP packet to obtain the data packet.

According to the sixth aspect, in a second possible implementation manner, that the processor determines an external gateway to which a data packet needs to be sent includes:

determining, according to a mapping relationship between a destination IP address of the data packet and an IP address of the external gateway, the external gateway to which the data packet needs to be sent.

With reference to the sixth aspect or the first possible implementation manner or the second possible implementation manner, in a third possible implementation manner, that the processor obtains a MAC address of the external gateway by using a forwarding plane device includes:

sending a MAC address request to the forwarding plane device, so that the forwarding plane device broadcasts the MAC address request, where the MAC address request includes an IP address of the external gateway and is used for requesting to obtain the MAC address of the external gateway; and receiving a MAC address request response sent by the forwarding plane device, where the MAC address request response includes the MAC address of the external gateway.

With reference to the sixth aspect or any implementation manner of the first to the third possible implementation manners, in a fourth possible implementation manner, the gateway control plane device further includes:

a memory, configured to cache the MAC address of the external gateway.

According to a seventh aspect, a forwarding plane device is provided and includes:

a communications unit, configured to communicate with an external device;

a processor, configured to obtain a MAC address of an external gateway that is determined by a gateway control plane device and to which a data packet needs to be sent; and a receiver, configured to receive, by using the communications unit, a processing rule sent by the gateway control plane device, where the processing rule includes the MAC address and is used for instructing to send the data packet to the external gateway, and the external gateway is located in an external network connected to the core network, where the processor is further configured to process the data packet according to the processing rule.

According to the seventh aspect, in a first possible implementation manner, the forwarding plane device further includes a transmitter, where the receiver is further configured to receive a general packet radio service tunneling protocol (GTP) packet by using the communications unit, where the GTP packet includes the data packet; and the transmitter is configured to send the GTP packet to the gateway control plane device by using the communications unit, so that the gateway control plane device decapsulates the GTP packet to obtain the data packet.

According to the first possible implementation manner, in a second possible implementation manner, the processing rule is further used for instructing to decapsulate the GTP packet; and the processor is further configured to decapsulate the GTP packet according to the processing rule, so as to obtain the data packet.

With reference to the seventh aspect or the first possible implementation manner or the second possible implementation manner, in a third possible implementation manner, that the processor obtains a MAC address of an external gateway that is determined by a gateway control plane device and to which a data packet needs to be sent includes:

receiving a MAC address request sent by the gateway control plane device, where the MAC address request includes an IP address of the external gateway and is used for requesting to obtain the MAC address of the external gateway; and broadcasting the MAC address request, receiving a MAC address request response sent by the external gateway, and sending the MAC address request response to the gateway control plane device, where the MAC address request response includes the MAC address of the external gateway.

According to the packet transmission method and device, and the communications system that are provided in the embodiments of the present invention, after determining an external gateway to which a data packet needs to be sent, a gateway control plane apparatus obtains a MAC address of the external network gateway by using a forwarding plane apparatus, so as to send a processing rule to the forwarding plane apparatus, so that the forwarding plane apparatus processes the data packet according to the processing rule, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

An existing OpenFlow architecture includes an OpenFlow switch and an external controller, and an OpenFlow switch includes a flow table (Flow Table), a secure channel, and the OpenFlow protocol (OF Protocol). Generally, the flow table stores core information to implement functions such as searching, forwarding, counting, and filtering. The switch is connected to the external controller (Controller) according to the OpenFlow protocol by using a secure channel, and the controller queries and manages the flow table. The OpenFlow switch is a core part in an entire OpenFlow network and mainly manages forwarding at a data layer. After receiving an incoming data packet, the OpenFlow switch first searches a flow table installed on the switch; and if there is no flow entry matching the data packet, forwards the data packet to the controller for determining.

In a mobile core network in which a control plane is separated from a forwarding plane, the forwarding plane is used to implement a packet forwarding function, and the control plane is used to implement control over packet forwarding. A function of the forwarding plane may be implemented by a forwarding plane apparatus, and a function of the control plane may be implemented by a control apparatus, gateway control plane apparatus. It may be understood that, the forwarding plane apparatus in the embodiments of the present invention may also be referred to as a switching device, a switch, or the like, and may be implemented by using an OpenFlow switch. The control apparatus, gateway control plane apparatus in the embodiments of the present invention may also be referred to as a control application, a controller, a control device, or the like, and may be implemented by using an OpenFlow controller.

Figure 1:
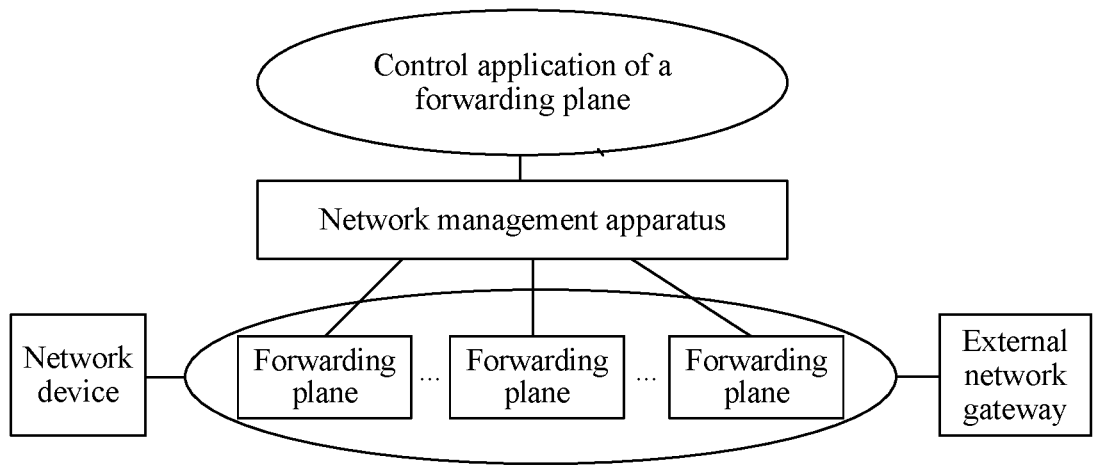
FIG. 1 is an architectural diagram of a forwarding plane entity and a control plane entity after a forwarding plane is separated from a control plane according to an embodiment of the present invention.

FIG. 1 is an exemplary architecture of a mobile core network in which a forwarding plane is separated from a control plane. In FIG. 1, the forwarding plane processes only a packet corresponding to a flow entry sent from the control plane, but does not process another packet. The foregoing forwarding plane apparatus may be implemented by an OpenFlow-enabled switch, such as an OpenFlow switch supported by all manufacturers, or by a switch implemented by using software Open vSwitch. A control plane apparatus of the forwarding plane may be a control application that controls the forwarding plane, that is, various applications that implement a control plane function, for example, an SGW control plane application, a PGW control plane application, and a route control plane application. The foregoing control application runs on a network management apparatus. The network management apparatus may be a system that has a controller architecture, and a network operating system is deployed on the network management apparatus, where the controller architecture includes current controller architectures such as NOX, PDX, and Floodlight. When a switching device needs to send a packet to a corresponding control application, the switching device first sends the packet to the network operating system, and the network operating system forwards the packet to the corresponding control application. In FIG. 1, a forwarding plane apparatus in the mobile core network is connected to a network device in an access network. The network device may be a different device according to a different network standard, for example, may be a base station, or may be a base station controller. In FIG. 1, the forwarding plane apparatus in the mobile core network is further connected to an external network gateway in an external network, and the external network may be an enterprise network or may be the Internet.

In another mobile core network in which a forwarding plane is separated from a control plane, a control application of the forwarding plane may be implemented by hardware and may also be referred to as a control device, for example, may be implemented by an OpenFlow controller. Each OpenFlow controller may integrate a control function of an SGW, a PGW, or the like, or one OpenFlow controller may integrate control functions of multiple forwarding planes. In the mobile core network, a network management apparatus is optional, and each control device may be connected to a corresponding forwarding plane apparatus. It may be understood that, a network management apparatus may be disposed in the mobile core network, and the network management apparatus may be implemented by hardware and may be referred to as a network management device. A switching device is interconnected with a control device by using the network management apparatus. When the switching device needs to send a packet to the control device, the switching device first sends the packet to the network management device, and the network management device sends the packet to the corresponding control device.

Persons of ordinary skill in the art should understand that a mobile core network in which a control plane is separated from a forwarding plane is not limited to the foregoing two examples, but may have another architecture, which is not limited in this embodiment of the present invention.

The foregoing descriptions and examples of a gateway control plane apparatus, a network management apparatus, and a forwarding plane apparatus are applicable to the following embodiments. In the following embodiments, related concepts and examples are not described in detail.

In the foregoing network architecture, after receiving a packet matching no flow entry, a switching device that supports the OpenFlow protocol adds the packet to a Packet_in message, and sends the Packet_in message to the gateway control plane apparatus. When a base station sends an ARP packet because the base station does not store a MAC address of a next-hop mobile core network node, the forwarding plane apparatus receives the ARP packet sent by the base station, and then, because there is no matched flow entry, the forwarding plane apparatus saves the ARP packet and sends the ARP packet to the control plane apparatus. When processing the ARP packet, an existing control plane apparatus generally instructs the switch to flood (FLOOD) the packet. In a mobile network, a data packet that needs to be transmitted is generally encapsulated in a GTP (GPRS tunneling protocol) packet for transmission. If the GTP packet includes an ARP (Address Resolution Protocol) request packet, because the forwarding plane apparatus has no flow entry that can match the GTP packet, after receiving the GTP packet, the forwarding plane apparatus floods the GTP packet. Consequently, a large quantity of GTP packets is generated in the network. After receiving the flooded GTP packet, the external network gateway cannot parse out the ARP request packet because the external network gateway does not support the GTP protocol, and therefore cannot process the ARP request packet in the GTP packet. However, once the ARP packet cannot be correctly processed, a communication failure is caused. Based on the foregoing case, the present invention provides a new packet transmission method and device, and a communications system.

Figure 2:
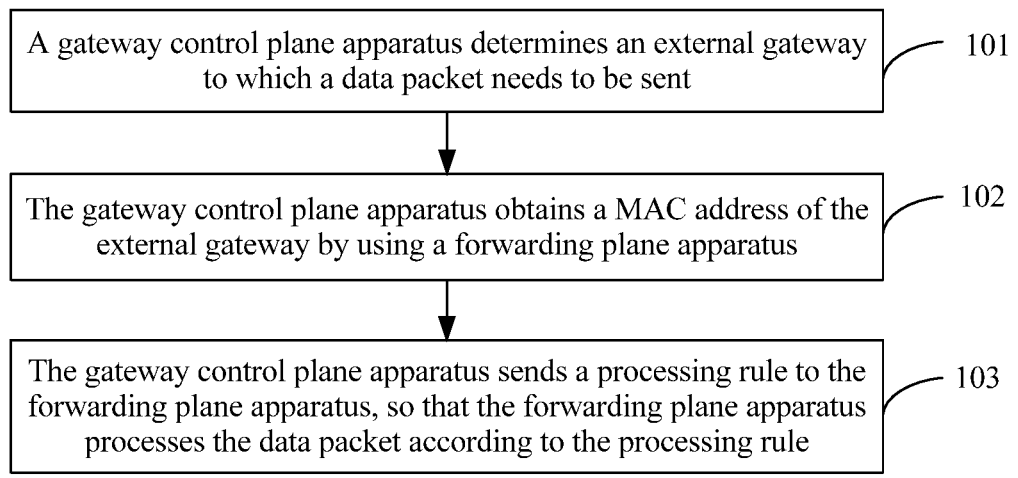
FIG. 2 is a schematic flowchart of a packet transmission method according to an embodiment of the present invention.

As shown in FIG. 2, an embodiment of the present invention provides a packet transmission method that may be implemented by a gateway control plane apparatus. This embodiment is mainly applied to a process of transmitting, to an external network, a data packet from a mobile core network (for example, a mobile core network to which an OpenFlow technology is applied) in which a control plane is separated from a forwarding plane. The packet transmission method includes the following steps:

101. The gateway control plane apparatus determines an external gateway to which a data packet needs to be sent.

Exemplarily, the gateway control plane apparatus in the present invention may be a control application that controls a forwarding plane, that is, various applications that implement a control plane function, for example, an SGW control plane application, a PGW control plane application, and a router control plane application. The gateway control plane apparatus may be a hardware entity or may be implemented by using software, and multiple gateway control plane apparatuses may be disposed on one hardware entity. A forwarding plane apparatus in the present invention may be implemented by an OpenFlow-enabled switch, such as an OpenFlow switch supported by all manufacturers, or by a switch implemented by using software Open vSwitch. An external network in the present invention may be an enterprise network, an Internet network, or the like.

Optionally, step 101 includes the following content: The gateway control plane apparatus may determine, according to a mapping relationship between a destination IP address of a data packet and an IP address of an external gateway, the external gateway to which the data packet needs to be sent.

Exemplarily, after obtaining a data packet sent by the forwarding plane apparatus, the gateway control plane apparatus may parse out a destination IP address of the data packet, may obtain a corresponding route selection policy according to the destination IP address, and then determine, according to the route selection policy and the destination IP address of the data packet, an IP address that is of an external network gateway and that is corresponding to the destination IP address. The route selection policy may be preconfigured in the gateway control plane apparatus, or may be obtained from another apparatus that stores the route selection policy. Exemplarily, the route selection policy may be a mapping relationship table between a destination IP address of a server and an IP address of an external network gateway, and is not limited in the present invention.

Optionally, before step 101, the method further includes:

101*a*. The gateway control plane apparatus receives a GTP packet sent by a forwarding plane apparatus.

101*b*. The gateway control plane apparatus decapsulates the GTP packet to obtain the data packet.

The foregoing GTP packet includes the data packet. The foregoing data packet may be encapsulated in the GTP (general packet radio service tunneling protocol) packet, or the data packet may be encapsulated in a packet transmission message and then reported to the gateway control plane apparatus.

102. The gateway control plane apparatus obtains a MAC address of the external gateway by using the forwarding plane apparatus.

Optionally, step 102 includes the following steps:

102*a*. The gateway control plane apparatus sends a MAC address request to the forwarding plane apparatus, so that the forwarding plane apparatus broadcasts the MAC address request.

The foregoing MAC address request includes an IP address of the external gateway and is used for requesting to obtain the MAC address of the external gateway. Exemplarily, the foregoing MAC address request may be an ARP request message, and the ARP request message may be sent by using the OpenFlow protocol, for example, may be encapsulated in a Packet_Out message, or may be directly sent.

102*b*. The gateway control plane apparatus receives a MAC address request response sent by the forwarding plane apparatus.

The foregoing MAC address request response includes the MAC address of the external gateway.

Exemplarily, the foregoing MAC address request may be generated by the gateway control plane apparatus and then forwarded by the forwarding plane apparatus, or may be generated and forwarded by the forwarding plane apparatus. For example, before step 102, the gateway control plane apparatus may generate the MAC address request according to the IP address of the external network gateway, and send the MAC address request to the forwarding plane apparatus, so that the forwarding plane apparatus broadcasts the MAC address request to the external network gateway. After receiving the MAC address request broadcast by the forwarding plane apparatus, the external network gateway adds the MAC address of the external network gateway to a corresponding MAC address request response and sends the corresponding MAC address request response to the forwarding plane apparatus.

It should be noted that, when the gateway control plane apparatus stores the MAC address corresponding to the IP address of the external network gateway, the gateway control plane apparatus may directly obtain the MAC address, without needing to perform the foregoing operations.

103. The gateway control plane apparatus sends a processing rule to the forwarding plane apparatus, so that the forwarding plane apparatus processes the data packet according to the processing rule.

The foregoing processing rule includes the MAC address and is used for instructing to send the data packet to the external gateway, and the external gateway is located in an external network connected to a core network.

Exemplarily, the foregoing processing rule may be a corresponding forwarding flow entry that is generated by the gateway control plane apparatus according to the MAC address after receiving the MAC address of the external network gateway, so that the forwarding plane apparatus forwards the data packet to the external network gateway according to the forwarding flow entry. The forwarding flow entry is an implementation manner of a forwarding rule and includes components, such as a match field, a counter, and an instruction set. Different manufacturers may design, according to respective requirements, forwarding flow entries that have different functions. The match field of the forwarding flow entry includes an ingress port, a packet header, and metadata determined by a previous flow table. The OpenFlow 1.2 standard defines 36 fields that are used for header field matching and are in packet headers of five layers from a data link layer to a transport layer. Each header field has three attribute requirements, a length, a mask, and a prerequisite. The counter of the forwarding flow entry collects traffic information, for example, an active entry, lookup times, and packet sending times, and may maintain each forwarding flow entry, each flow, each port, and each queue. The instruction set of a flow table may be classified into required actions and optional actions. Three required actions are: forwarding a flow to a given port; encapsulating and forwarding a packet of the flow to a controller, so that the controller determines whether to add a flow into a flow table; and discarding the packet.

It should be noted that, after receiving the MAC address that is reported by the forwarding plane apparatus and is of the external network gateway, the gateway control plane apparatus may store the MAC address of the external network gateway, so that after subsequently receiving a data packet reported by the forwarding plane apparatus, the gateway control plane apparatus may directly deliver a corresponding processing rule to the forwarding plane apparatus according to the MAC address of the external network gateway.

Exemplarily, a network management apparatus may further be disposed between the forwarding plane apparatus and the gateway control plane apparatus. In a network architecture in which a network management apparatus is disposed, a forwarding plane apparatus may send all information such as a reported data packet to the network management apparatus, and the network management apparatus forwards the information to a corresponding gateway control plane apparatus; information sent by a gateway control plane apparatus to the forwarding plane apparatus may also be forwarded by the network management apparatus. For example, in the architecture in which the network management apparatus is disposed, after the gateway control plane apparatus receives, from the network management apparatus, the data packet reported by the forwarding plane apparatus, if the gateway control plane apparatus does not store the MAC address of the external network gateway, the gateway control plane apparatus sends a MAC address request to the forwarding plane apparatus by using the network management apparatus, and the gateway control plane apparatus delivers, to the forwarding plane apparatus by using the network management apparatus, a processing rule corresponding to the data packet. The network management apparatus may be implemented by software or may be implemented by hardware. Exemplarily, the network management apparatus may be a network operating system, and several control apparatus applications run in the network operating system.

In the packet transmission method provided in this embodiment of the present invention, after determining an external gateway to which a data packet needs to be sent, a gateway control plane apparatus obtains a MAC address of the external network gateway by using a forwarding plane apparatus, so as to send a processing rule to the forwarding plane apparatus, so that the forwarding plane apparatus processes the data packet according to the processing rule, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

Figure 3:
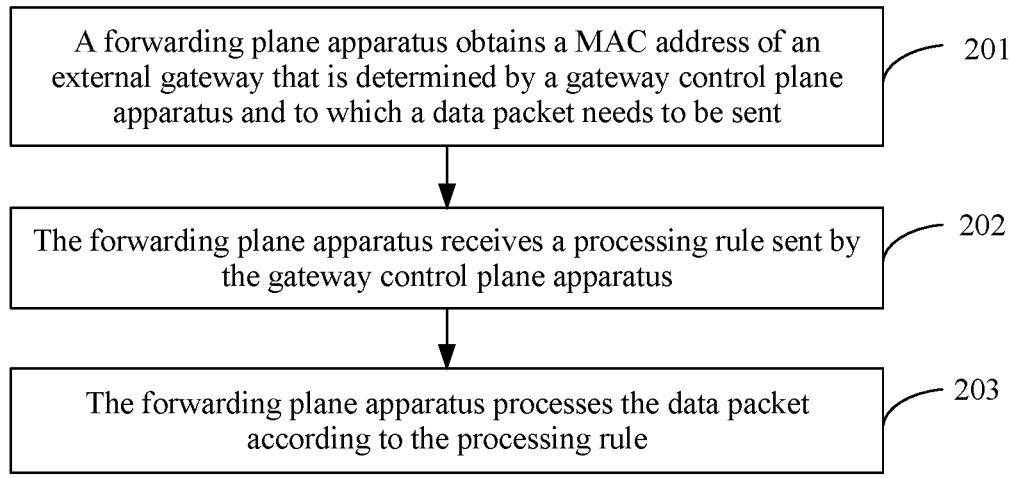
FIG. 3 is a schematic flowchart of another packet transmission method according to an embodiment of the present invention.

As shown in FIG. 3, an embodiment of the present invention provides a packet transmission method that may be implemented by a forwarding plane apparatus. This embodiment is mainly applied to a process of transmitting, to an external network, a data packet from a mobile core network (for example, a mobile core network to which an OpenFlow technology is applied) in which a control plane is separated from a forwarding plane. The packet transmission method includes the following steps:

201. The forwarding plane apparatus obtains a MAC address of an external gateway that is determined by a gateway control plane apparatus and to which a data packet needs to be sent.

Exemplarily, the forwarding plane apparatus in the present invention may be implemented by an OpenFlow-enabled switch, such as an OpenFlow switch supported by all manufacturers, or by a switch implemented by using software Open vSwitch. The gateway control plane apparatus in the present invention may be a control application that controls a forwarding plane, that is, various applications that implement a control plane function, for example, an SGW control plane application, a PGW control plane application, and a router control plane application. The gateway control plane apparatus may be a hardware entity or may be implemented by using software, and multiple gateway control plane apparatuses may be disposed on one hardware entity. An external network in the present invention may be an enterprise network, an Internet network, or the like.

Optionally, step 201 includes the following steps:

201a. The forwarding plane apparatus receives a MAC address request sent by the gateway control plane apparatus.

The foregoing MAC address request includes an IP address of the external gateway and the MAC address request is used for requesting to obtain the MAC address of the external gateway.

201b. The forwarding plane apparatus broadcasts the MAC address request, receives a MAC address request response sent by the external gateway, and sends the MAC address request response to the gateway control plane apparatus.

The foregoing MAC address request response includes the MAC address of the external gateway.

Exemplarily, after receiving the MAC address request sent by the gateway control plane apparatus, the forwarding plane apparatus broadcasts the MAC address request outward, so that an external network gateway can receive the MAC address request message; after receiving the MAC address request message, an external network gateway corresponding to the IP address in the MAC address request feeds back a MAC address of the external network gateway itself to the forwarding plane apparatus. Exemplarily, the foregoing MAC address request response may be an ARP response message, and the ARP response message may be sent by using the OpenFlow protocol, for example, may be encapsulated in a Packet_In message, or may be directly sent.

Optionally, before step 201, the method further includes the following steps:

a1. The forwarding plane apparatus receives a general packet radio service tunneling protocol (GTP) packet.

a2. The forwarding plane apparatus sends the GTP packet to the gateway control plane apparatus, so that the gateway control plane apparatus decapsulates the GTP packet to obtain the data packet.

The foregoing GTP packet includes the data packet. Exemplarily, after a base station finds a corresponding forwarding plane apparatus, the base station sends a GTP packet to the forwarding plane apparatus. Because the forwarding plane apparatus does not have a GTP packet parsing function, the forwarding plane apparatus forwards the GTP packet to a corresponding gateway control plane apparatus, and then the gateway control plane apparatus parses the GTP packet to obtain a data packet.

202. The forwarding plane apparatus receives a processing rule sent by the gateway control plane apparatus.

The foregoing processing rule includes the MAC address and is used for instructing to send the foregoing data packet to the external gateway, and the external gateway is located in an external network connected to a core network.

Exemplarily, after receiving the MAC address request response sent by the forwarding plane apparatus, the gateway control plane apparatus extracts the MAC address of the external gateway from the MAC address request response, generates, by means of processing, a processing rule for processing the foregoing GTP packet by the forwarding plane apparatus, and sends the processing rule to the forwarding plane apparatus. The foregoing processing rule may be a corresponding forwarding flow entry that is generated by the gateway control plane apparatus according to the MAC address after receiving the MAC address of the external network gateway, so that the forwarding plane apparatus forwards the data packet to the external network gateway according to the forwarding flow entry.

It should be noted that, the processing rule received by the forwarding plane apparatus in step 202 is further used for instructing to decapsulate the foregoing GTP packet, so that the forwarding plane apparatus decapsulates the GTP packet according to the processing rule after receiving the GTP packet sent by the base station, so as to obtain the data packet in the GTP packet.

203. The forwarding plane apparatus processes the data packet according to the processing rule.

Exemplarily, after receiving the processing rule sent by the gateway control plane apparatus, the forwarding plane apparatus processes a subsequent GTP packet according to the processing rule. The forwarding plane apparatus decapsulates the GTP packet according to the processing rule, so as to obtain the data packet, and sends the data packet to the corresponding external gateway according to the MAC address, of the external gateway, in the processing rule; then, the external gateway sends the data packet to a destination IP address, thereby implementing a process of transmitting a data packet from a mobile core network to an external network. Exemplarily, the forwarding plane apparatus sends the data packet to the external network gateway according to the forwarding flow entry.

In the packet transmission method provided in this embodiment of the present invention, after a gateway control plane apparatus determines an external gateway to which a data packet needs to be sent, the forwarding plane apparatus obtains a MAC address of the external network gateway, and sends the MAC address of the external network gateway to the gateway control plane apparatus, so as to process the foregoing data packet according to a processing rule after receiving the processing rule sent by the gateway control plane apparatus, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

The following exemplarily describes the packet transmission methods provided in the embodiments of the present invention from multiple perspectives in specific scenarios. For descriptions about a technical term, a concept, and the like that are in the following embodiments and related to the foregoing embodiments, reference may be made to the foregoing embodiments.

Figure 4:
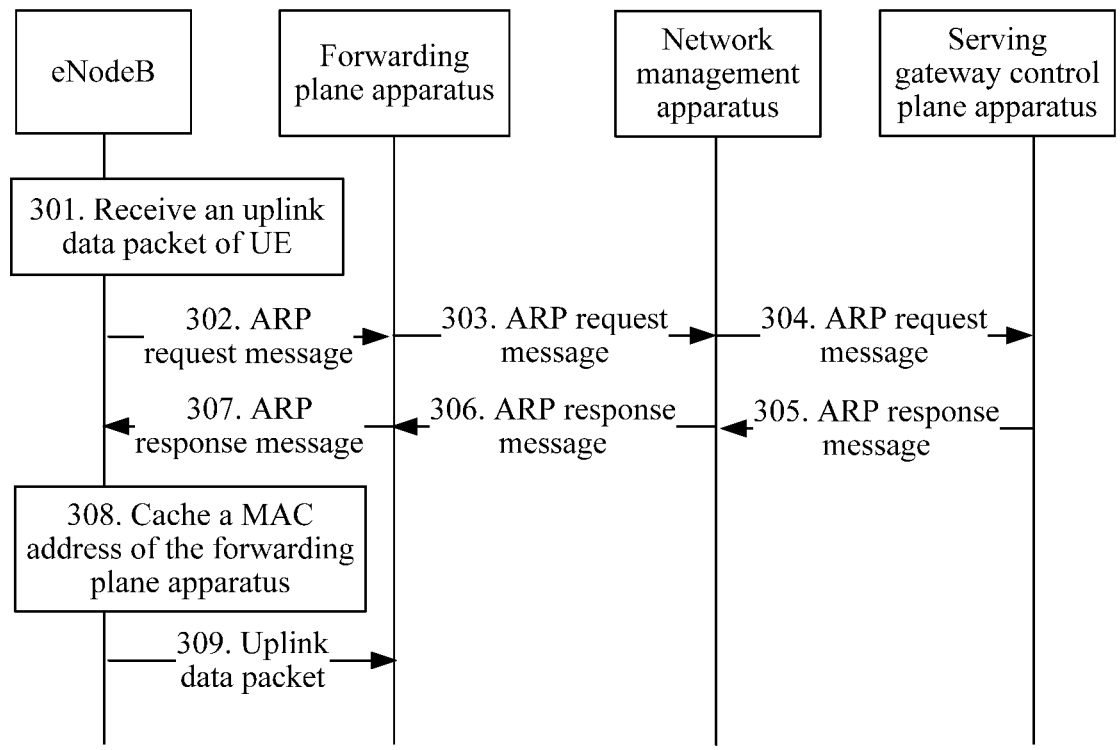
FIG. 4 is a schematic flowchart of still another packet transmission method according to an embodiment of the present invention.
Figure 5:
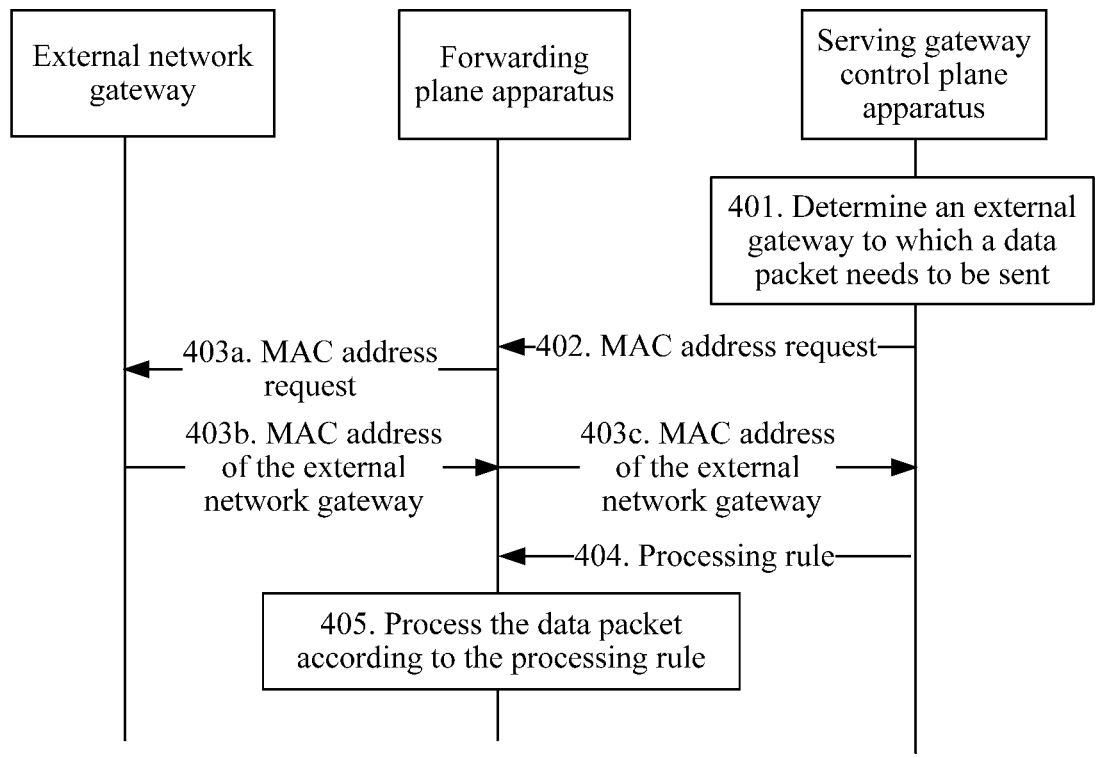
FIG. 5 is a schematic flowchart of yet another packet transmission method according to an embodiment of the present invention.

The following embodiments are mainly applied to a process of transmitting a data packet from a mobile core network to an external network. As shown in FIG. 4 and FIG. 5, specific implementation of the packet transmission methods provided in the embodiments of the present invention may also vary according to different network architectures. Exemplarily, a first network architecture includes a forwarding plane apparatus and a gateway control plane apparatus; in a second network architecture, a network management apparatus may be disposed between a forwarding plane apparatus and a gateway control plane apparatus, where in the second network architecture, the gateway control plane apparatus may be a physical device, or may be a control device application that runs on the network management apparatus and performs a control device function.

In a process in which a network device sends a data packet to a mobile core network, to more efficiently implement successful data packet transmission, a network management apparatus may be disposed in the network. For a specific example, reference may be made to the embodiment shown in FIG. 4.

As shown in FIG. 4,

301. An eNodeB receives an uplink data packet of UE.

Exemplarily, a destination IP address of the uplink data packet is an IP address of a server, and a destination MAC address of the uplink data packet is a MAC address of the eNodeB. After receiving the uplink data packet, the eNodeB needs to change a MAC address of the uplink data packet to a MAC address of a next hop. Because the MAC address of the next hop (that is, an SGW) is not configured in the eNodeB, the eNodeB broadcasts an ARP message to obtain the MAC address of the SGW, where the ARP message carries an IP address of the SGW, which may be referred to as a destination IP address.

302. The eNodeB broadcasts an ARP request message.

Exemplarily, an IP address that is requested by the ARP request message broadcast by the eNodeB is an IP address of a gateway of a mobile core network, and a MAC address corresponding to the IP address is desired to be obtained. In addition, because the eNodeB is connected to multiple forwarding plane apparatuses, the eNodeB broadcasts the ARP message to a forwarding plane apparatus 1 and a forwarding plane apparatus 2, where in the ARP request message, a source IP address is an IP address of the eNodeB, a source MAC address is the MAC address of the eNodeB, a destination IP address is the IP address of the next hop (SGW), and a destination MAC address is FFFFFF (FFFFFF is specified in a protocol).

303. After receiving the ARP request message broadcast by the eNodeB, a forwarding plane apparatus sends the ARP request message to a network management apparatus.

Exemplarily, if the OpenFlow protocol is used between a gateway control plane apparatus and a forwarding plane apparatus that are in the mobile core network, after receiving the ARP request message broadcast by the eNodeB, because a forwarding flow entry for processing a packet of the ARP request message is not configured, the forwarding plane apparatus encapsulates the ARP request message in a Packet_in message, and sends the Packet_in message to the network management apparatus, so that the network management apparatus forwards the Packet_in message to a corresponding gateway control plane apparatus.

304. The network management apparatus forwards the ARP request to a gateway control plane apparatus.

Exemplarily, after receiving the ARP request message sent by the forwarding plane apparatus, the network management apparatus may find a corresponding gateway control plane apparatus according to the IP address requested by the ARP request message, and send the ARP request message to the corresponding gateway control plane apparatus. For example, after receiving the Packet_in message sent by the forwarding plane apparatus, the network management apparatus may parse out the ARP request message from the Packet_in message. The network management apparatus may directly send the ARP request message to the gateway control plane apparatus, or may encapsulate the ARP request message again and send an encapsulated ARP request message to the gateway control plane apparatus. A protocol used for the second encapsulation may be a corresponding protocol in OpenFlow, or may be another protocol pre-agreed on between the network management apparatus and the gateway control plane apparatus.

Exemplarily, the network management apparatus may send, in a broadcast manner, the ARP request message received from the forwarding plane apparatus to a corresponding gateway control plane apparatus. For example, after receiving the ARP request message sent by the forwarding plane apparatus, or obtaining the ARP request message by parsing the Packet_in message sent by the forwarding plane apparatus, the network management apparatus replaces a source address in the ARP request message with a MAC address of the network management apparatus, and then broadcasts a modified ARP request message, so that the gateway control plane apparatus can send a response message for the ARP request message to the network management apparatus.

305. The gateway control plane apparatus sends an ARP response message to the network management apparatus.

The ARP response message carries a MAC address of the gateway control plane apparatus.

Exemplarily, after receiving the ARP request message, the gateway control plane apparatus adds the MAC address of the gateway control plane apparatus to the ARP response message and sends the ARP response message to the network management apparatus. Alternatively, the gateway control plane apparatus may encapsulate the ARP request message and then send an encapsulated ARP request message to the network management apparatus, where encapsulation may be performed by using the OpenFlow protocol, for example, the ARP response message may be encapsulated in the Packet_out message, or may be encapsulated by using another protocol.

Exemplarily, the gateway control plane apparatus sends the ARP response message to the forwarding plane apparatus 1, where the ARP response message may be sent by using the Packet_out message, and the ARP response message carries the foregoing MAC address. First indication information may be carried in the Packet_out message and sent to the forwarding plane apparatus 1, or first indication information is separately sent to the forwarding plane apparatus 1, where the first indication information is used for instructing to send the ARP response to the eNodeB, and the first indication information may be a flow entry. If there are multiple forwarding planes, second indication information may be sent by an SGW control plane to the forwarding plane apparatus 2, and is used for instructing, when the forwarding plane apparatus 2 receives a data packet whose destination MAC address is the foregoing MAC address, to discard the data packet. In this way, it may be implemented that the eNodeB sends the ARP response message to a correct forwarding plane apparatus, where the second indication information may also be a flow entry.

306. The network management apparatus sends the ARP response message to the forwarding plane apparatus.

Exemplarily, after receiving the ARP response message, the network management apparatus may first encapsulate the ARP response message, and then send an encapsulated ARP response message to the forwarding plane apparatus. For example, the network management apparatus encapsulates the ARP response message in a Packet_out message and sends the Packet_out message to the forwarding plane apparatus.

307. The forwarding plane apparatus sends the received ARP response message to the eNodeB.

308. The eNodeB caches a MAC address, of a forwarding plane apparatus, in the ARP response message.

After caching the MAC address of the forwarding plane apparatus, the eNodeB saves a correspondence between a MAC address of a forwarding plane apparatus and an IP address of the forwarding plane apparatus, and the IP address of the forwarding plane apparatus is the IP address requested by the ARP request message broadcast by the eNodeB.

The eNodeB caches the MAC address of the forwarding plane apparatus, so that the eNodeB no longer needs to obtain, by using an ARP request, the MAC address of the forwarding plane apparatus when the eNodeB subsequently receives a corresponding uplink data packet.

309. The eNodeB sends the uplink data packet to the forwarding plane apparatus corresponding to the MAC address.

Exemplarily, the eNodeB may perform GTP encapsulation on the uplink data, and send encapsulated uplink data to the forwarding plane apparatus corresponding to the MAC address.

Exemplarily, the forwarding plane apparatus that sends the ARP request message broadcast by the eNodeB to the network management apparatus and the forwarding plane apparatus corresponding to the MAC address may be a same device, or may be different forwarding plane apparatuses.

In the packet transmission method provided in this embodiment of the present invention, a network management apparatus selects a correct gateway control plane apparatus to deliver a MAC address of a forwarding plane apparatus to a network device, so that an eNodeB can successfully send an uplink data packet to the forwarding plane apparatus, which increases a success rate of data packet transmission from a mobile access network to a mobile core network.

The following describes a method for sending a data packet from a mobile core network to an external network.

For an implementation manner of the packet transmission method in the first network architecture according to this embodiment of the present invention, reference may be made to FIG. 5. As shown in FIG. 5, 401. A gateway control plane apparatus determines an external gateway to which a data packet needs to be sent.

Exemplarily, the gateway control plane apparatus herein may be a device that has a control plane function of an SGW, a PGW, or the like. One gateway control plane apparatus may integrate multiple control plane functions, and the gateway control plane apparatus herein may be implemented by using an OpenFlow-enabled controller. Exemplarily, a forwarding plane apparatus herein may be an OpenFlow-enabled switch. Exemplarily, the foregoing external network may be an enterprise network, an Internet network, or the like. The foregoing data packet may be a data packet encapsulated as a GTP packet.

Exemplarily, the gateway control plane apparatus determines, according to a route selection policy and a destination IP address of a data packet reported by the forwarding plane apparatus, an IP address that is of an external network gateway and is corresponding to the destination IP address. The foregoing route selection policy may be a mapping relationship between a destination IP address of a data packet and an IP address of an external network gateway, and the route selection policy may be preconfigured in the gateway control plane apparatus, or may be obtained from another network device. Exemplarily, the gateway control plane apparatus may parse out the destination IP address of the data packet from the data packet reported by the forwarding plane apparatus, and then obtain the IP address of the external network gateway according to the mapping relationship between a destination IP address and an IP address of an external network gateway.

402. When the gateway control plane apparatus does not store a MAC address corresponding to an IP address of an external network gateway, the gateway control plane apparatus sends a MAC address request to a forwarding plane apparatus.

The foregoing MAC address request includes the IP address of the external gateway and the MAC address request is used for requesting to obtain the MAC address of the external gateway.

Exemplarily, the foregoing MAC address request may be an ARP request message, and the ARP request message may be sent by using the OpenFlow protocol, for example, may be encapsulated in a Packet_out message, or may be directly sent.

Optionally, before step 402, the method further includes: The gateway control plane apparatus generates the MAC address request according to the IP address of the external network gateway, where the foregoing MAC address request includes a MAC address request message.

Optionally, after receiving the MAC address of the external network gateway, the gateway control plane apparatus may further save the MAC address of the external network gateway. Through the foregoing process, subsequently the gateway control plane apparatus no longer needs to instruct the forwarding plane apparatus to query the MAC address of the external network gateway, thereby saving a network resource.

Exemplarily, the gateway control plane apparatus may obtain the MAC address of the external network gateway by instructing the forwarding plane apparatus to broadcast the MAC address request sent by the gateway control plane apparatus, so as to subsequently generate a corresponding flow entry for the data packet reported in step 401, thereby implementing correct data packet transmission.

403*a*. The forwarding plane apparatus broadcasts the MAC address request to the external network gateway to obtain a MAC address of the external network gateway.

Exemplarily, after receiving the MAC address request sent by the gateway control plane apparatus, the forwarding plane apparatus broadcasts the MAC address request message to the external network gateway, so as to obtain the MAC address of the external network gateway.

403*b*. After receiving the MAC address request, the external network gateway sends the MAC address of the external network gateway to the forwarding plane apparatus.

403*c*. The forwarding plane apparatus reports the received MAC address of the external network gateway to the gateway control plane apparatus.

404. The gateway control plane apparatus sends a processing rule to the forwarding plane apparatus.

Exemplarily, the foregoing processing rule may be a corresponding forwarding flow entry that is generated by the gateway control plane apparatus according to the MAC address after receiving the MAC address of the external network gateway, so that the forwarding plane apparatus forwards the data packet to the external network gateway according to the forwarding flow entry.

405. The forwarding plane apparatus processes the data packet according to the processing rule.

Exemplarily, the forwarding plane apparatus sends the data packet to the external network gateway according to the forwarding flow entry.

In the packet transmission method provided in this embodiment of the present invention, a gateway control plane apparatus instructs a forwarding plane apparatus to obtain a MAC address of an external network gateway, so that the gateway control plane apparatus can successfully deliver a forwarding flow entry of a reported data packet to the forwarding plane apparatus, and therefore, the forwarding plane apparatus can send the data packet to the external network gateway according to the forwarding flow entry, thereby successfully implementing data packet transmission from a mobile network to an external network.

In the second network architecture, a network management apparatus is disposed between a forwarding plane apparatus and a gateway control plane apparatus, and in a process of transmitting a data packet from a mobile core network to an external network, an information exchange between the forwarding plane apparatus and the gateway control plane apparatus is performed by using the network management apparatus.

Exemplarily, in step 402, when the gateway control plane apparatus does not store the MAC address corresponding to the IP address of the external network gateway, the gateway control plane apparatus sends the MAC address request to the forwarding plane apparatus by using the network management apparatus.

Exemplarily, in step 403*c*, the forwarding plane apparatus reports the MAC address of the external network gateway to the gateway control plane apparatus by using the network management apparatus.

Exemplarily, in step 404, the gateway control plane apparatus delivers, to the forwarding plane apparatus by using the network management apparatus, a forwarding flow entry corresponding to the data packet.

A network management apparatus forwards information between a forwarding plane apparatus and a gateway control plane apparatus, which helps to simplify deployment of the forwarding plane apparatus, so that the forwarding plane apparatus needs to send, only to the network management apparatus, information that needs to be sent to the gateway control plane apparatus, and the network management apparatus forwards the information to a corresponding gateway control plane apparatus according to a preset rule, which is more helpful for implementing separation of control and forwarding.

Likewise, the network device may be an external network gateway. Downlink data packet transmission from the external network gateway to the forwarding plane apparatus may be implemented by using the method shown in FIG. 4, which successfully implements sending a data packet from an external network to a mobile core network.

It can be seen from the foregoing embodiments that in a network architecture that uses technologies of separating control from forwarding, sending data from a mobile core network to an external network, sending data from a mobile access network to a mobile core network, sending data from an external network to a mobile core network, and the like may be separately implemented by using the packet transmission methods provided in the embodiments of the present invention. Therefore, according to the packet transmission method provided by the present invention, data packet transmission from a mobile core network to an exterior (mobile access network or external network) may be successfully implemented, and data packet transmission from another network (mobile access network or external network) to a mobile core network may also be successfully implemented. Exemplarily, it can be learned from the foregoing several embodiments of the present invention that transmitting a data packet from a base station to a mobile core network and then to an external network or from an external network to a mobile core network and then to a base station may be completed and implemented by combining the packet transmission methods provided in the different embodiments of the present invention. An uplink data packet is used as an example. For example, user equipment sends the data packet to an Internet server by using a base station. For a data packet transmission process, reference may be made to the following. For content such as a related technical term, a concept, and the like, reference may be made to a related part in the foregoing embodiments, and details are not described herein.

(1) When UE needs to send a data packet to an Internet server, the UE first needs to send the data packet to a base station.

(2) After receiving the data packet sent by the UE, the base station encapsulates the data packet as a GTP packet, and sends the GTP packet to a forwarding plane apparatus. If the base station stores a MAC address corresponding to an IP address of the forwarding plane apparatus, that is, a MAC address of the forwarding plane apparatus, the base station may directly send the GTP packet to the corresponding forwarding plane apparatus. If the base station does not store the MAC address of the forwarding plane apparatus, the base station needs to obtain the MAC address of the forwarding plane apparatus. The base station may obtain the MAC address of the forwarding plane apparatus in a manner of an ARP request. Exemplarily, the base station broadcasts an ARP request message outward. An IP address requested by the ARP request message is the IP address of the forwarding plane apparatus. The ARP request message is used for instructing to obtain a MAC address of a forwarding plane apparatus whose IP address is the requested IP address. After receiving the broadcast ARP request message, because the forwarding plane apparatus cannot process the ARP request message, the forwarding plane apparatus needs to send the ARP request message to a gateway control plane apparatus for processing. Certainly, the forwarding plane apparatus herein may send the ARP request message to a network management apparatus, so that the network management apparatus forwards the ARP request message to a corresponding gateway control plane apparatus for processing. After receiving the ARP request message, the gateway control plane apparatus responds to the ARP request message, and returns the MAC address corresponding to the IP requested by the ARP request message, so that an eNodeB can find, by using the MAC address, a forwarding plane apparatus corresponding to the MAC address. After receiving the ARP request message, the network management apparatus may send the ARP request to a corresponding gateway control plane apparatus in two manners. One manner is: The network management apparatus parses out the IP address requested by the ARP request message, selects a corresponding gateway control plane apparatus according to the requested IP address, and sends the ARP request to the corresponding gateway control plane apparatus; the other manner is: the network management apparatus broadcasts the ARP request to a gateway control plane apparatus, so as to obtain a response from a corresponding gateway control plane apparatus, where after receiving the ARP request message sent by the forwarding plane apparatus, the network management apparatus replaces a source MAC address in the ARP request with a MAC address of the network management apparatus, and then broadcasts the ARP request. In this way, after receiving the ARP request, the corresponding gateway control plane apparatus sends an ARP response message to the network management apparatus. After receiving the ARP request message, the corresponding gateway control plane apparatus responds to the ARP request message, and returns the MAC address corresponding to the IP requested by the ARP request message, so that the eNodeB can find, by using the MAC address, the forwarding plane apparatus corresponding to the MAC address. After receiving the MAC address sent by the gateway control plane apparatus, the network management apparatus sends the MAC address to the forwarding plane apparatus. After receiving the MAC address, the forwarding plane apparatus sends the MAC address to the eNodeB. Corresponding encapsulation, for example, GTP encapsulation, may be performed in the foregoing process of transmitting the foregoing MAC address from the network management apparatus to the eNodeB. After receiving the MAC address corresponding to the requested IP address, the eNodeB caches the MAC address, and also records a correspondence between the IP address and the MAC address. In this way, the MAC address corresponding to the IP address no longer needs to be obtained subsequently, which reduces signaling overheads and improves efficiency. After obtaining the MAC address of the forwarding plane apparatus, the eNodeB may send the data packet to the forwarding plane apparatus.

(3) The forwarding plane apparatus forwards the data packet to another forwarding plane apparatus. This step is optional.

(4) The forwarding plane apparatus sends the data packet to an Internet gateway.

After the forwarding plane apparatus receives the data packet, because the forwarding plane apparatus does not store a forwarding flow entry for processing the data packet, the forwarding plane apparatus needs to report the received data packet to the gateway control plane apparatus, for example, may encapsulate the data packet in a Packet_in message and send the Packet_in message to the network management apparatus, and the network management apparatus sends the Packet_in message to a corresponding gateway control plane apparatus. After receiving the data packet, the gateway control plane apparatus obtains a destination IP address of the data packet by parsing the data packet, and learns, according to a correspondence between the destination IP address and an IP address of an Internet gateway, an Internet gateway to which the data packet should be sent. Because the gateway control plane apparatus does not store a MAC address of the Internet gateway, the gateway control plane apparatus further needs to obtain the MAC address of the Internet gateway from an exterior, so as to generate a forwarding flow entry and deliver the forwarding flow entry to the forwarding plane apparatus, so that the forwarding plane apparatus sends the data packet to the corresponding Internet gateway. In an example, the gateway control plane apparatus may instruct the forwarding plane apparatus to send an ARP request message, so as to obtain the MAC address of the Internet gateway. The gateway control plane apparatus sends a MAC address request to the forwarding plane apparatus by using the network management apparatus, and instructs the forwarding plane apparatus to broadcast the ARP request message, so that the ARP request message can be sent to a corresponding Internet gateway, so as to obtain a MAC address of the Internet gateway. The ARP request message broadcast by the forwarding plane apparatus may be generated by the forwarding plane apparatus, or may be generated by the gateway control plane apparatus and carried in the foregoing MAC address request and sent to the forwarding plane apparatus. After receiving the ARP request message, the Internet gateway sends the MAC address of the Internet gateway to the forwarding plane apparatus by using an ARP response message. After receiving the MAC address, the forwarding plane apparatus may report the MAC address to the gateway control plane apparatus by using the network management apparatus. After receiving the MAC address of the corresponding Internet gateway, the gateway control plane apparatus may deliver, to the forwarding plane apparatus, a forwarding flow entry that instructs the forwarding plane apparatus to forward the data packet to the Internet gateway. After receiving the forwarding flow entry delivered by the gateway control plane apparatus, the forwarding plane apparatus may send the data packet to the corresponding Internet gateway according to the forwarding flow entry, and subsequently, the Internet gateway may send the data packet to a corresponding Internet server. So far, data packet transmission from user equipment to a mobile core network, and from the mobile core network to the Internet is completed.

The embodiments of the present invention further provide corresponding devices to implement the packet transmission methods provided in the embodiments of the present invention.

An embodiment of the present invention provides a gateway control plane apparatus 5 that may be used to implement the gateway control plane apparatus in the embodiments shown in FIG. 2, FIG. 3, FIG. 4, and FIG. 5. For content such as a working mechanism, interaction with another network element, a related technical term, and a concept that are of the gateway control plane apparatus, reference may be made to the embodiments shown in FIG. 1 to FIG. 5. The gateway control plane apparatus in this embodiment of the present invention may be a hardware entity, or may be implemented by software. Exemplarily, the gateway control plane apparatus may be a control plane apparatus of an SGW, a PGW, or the like, and multiple gateway control plane apparatuses may be disposed on one hardware entity.

Figure 6:
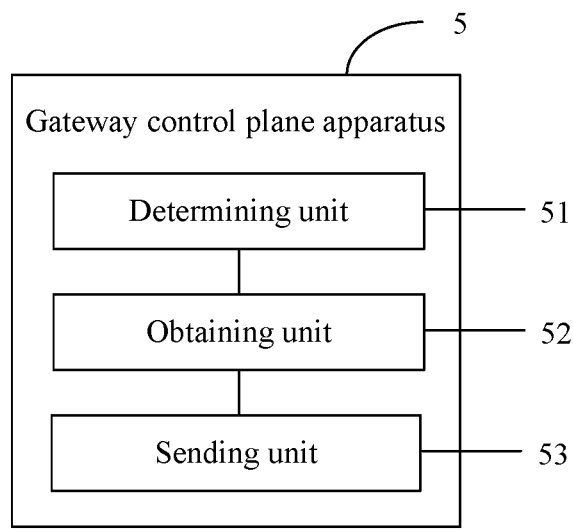
FIG. 6 is a schematic apparatus diagram of a gateway control plane apparatus according to an embodiment of the present invention.

As shown in FIG. 6, the gateway control plane apparatus 5 includes: a determining unit 51, an obtaining unit 52, and a sending unit 53.

The determining unit 51 is configured to determine an external gateway to which a data packet needs to be sent.

The obtaining unit 52 is configured to obtain, by using a forwarding plane apparatus, a MAC address of the external gateway determined by the determining unit 51.

The sending unit 53 is configured to send a processing rule to the forwarding plane apparatus, so that the forwarding plane apparatus processes the data packet according to the processing rule.

The foregoing processing rule includes the MAC address and is used for instructing to send the data packet to the external gateway, and the external gateway is located in an external network connected to a core network.

Optionally, the determining unit 51 is configured to determine, according to a mapping relationship between a destination IP address of a data packet and an IP address of an external gateway, the external gateway to which the data packet needs to be sent.

Figure 7:
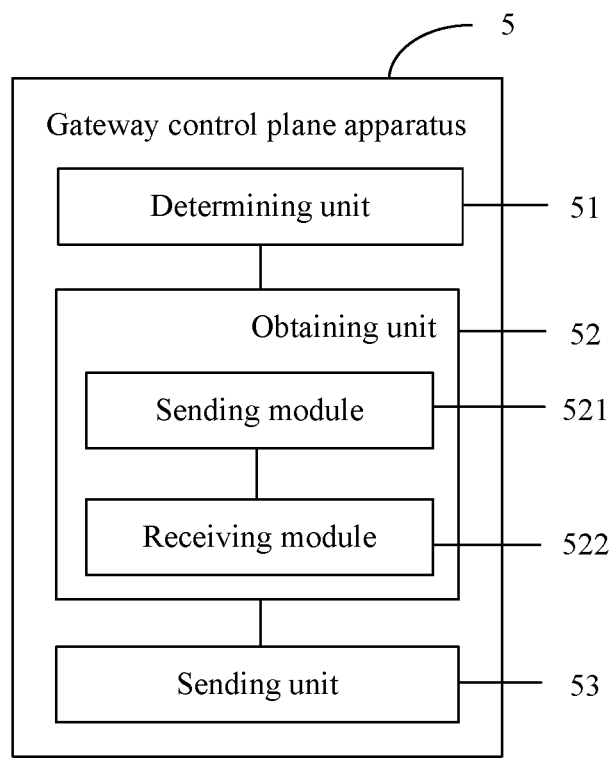
FIG. 7 is a schematic apparatus diagram of another gateway control plane apparatus according to an embodiment of the present invention.

Optionally, as shown in FIG. 7, the obtaining unit 52 further includes a sending module 521 and a receiving module 522.

The sending module 521 is configured to send a MAC address request to the forwarding plane apparatus, so that the forwarding plane apparatus broadcasts the MAC address request.

The foregoing MAC address request includes an IP address of the external gateway and is used for requesting to obtain the MAC address of the external gateway.

The receiving module 522 is configured to receive a MAC address request response sent by the forwarding plane apparatus.

The foregoing MAC address request response includes the MAC address of the external gateway.

Figure 8:
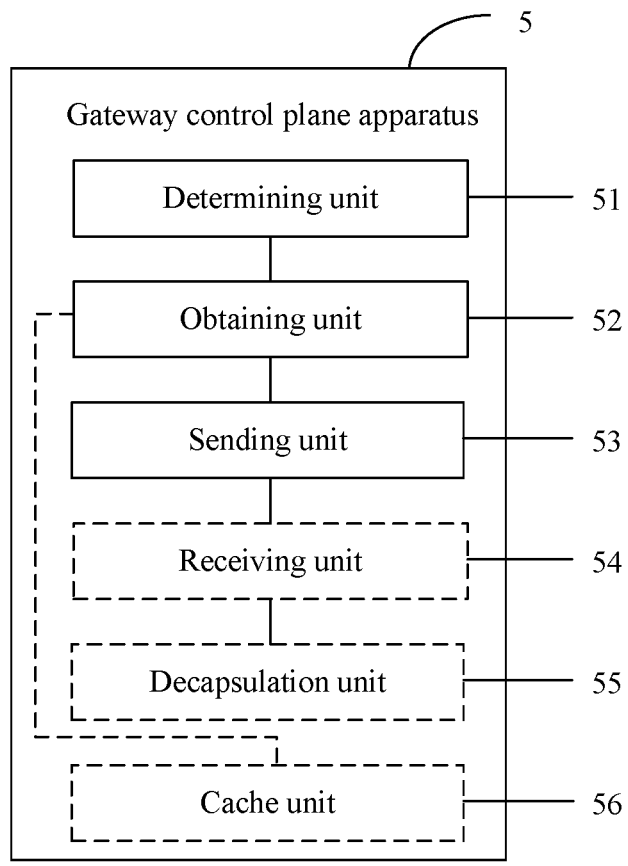
FIG. 8 is a schematic apparatus diagram of still another gateway control plane apparatus according to an embodiment of the present invention.

Optionally, as shown in FIG. 8, the gateway control plane apparatus 5 further includes a receiving unit 54 and a decapsulation unit 55.

The receiving unit 54 is configured to receive a GTP packet sent by the forwarding plane apparatus.

The decapsulation unit 55 is configured to decapsulate the GTP packet to obtain the data packet.

Optionally, as shown in FIG. 8, the gateway control plane apparatus 5 further includes a cache unit 56, where the cache unit 56 is configured to cache the MAC address that is of the external gateway and that is obtained by the obtaining unit 52.

Unit division of the gateway control plane apparatus in this embodiment of the present invention is described as an example, and practically there may have multiple unit division methods to construct the gateway control plane apparatus in this embodiment of the present invention.

According to the gateway control plane apparatus provided in this embodiment of the present invention, after determining an external gateway to which a data packet needs to be sent, the gateway control plane apparatus obtains a MAC address of the external network gateway by using a forwarding plane apparatus, so as to send a processing rule to the forwarding plane apparatus, so that the forwarding plane apparatus processes the data packet according to the processing rule, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

An embodiment of the present invention provides a forwarding plane apparatus 6 that may be configured to implement the forwarding plane apparatus in the embodiments shown in FIG. 2, FIG. 3, FIG. 4, and FIG. 5. For content about the forwarding plane apparatus provided in this embodiment of the present invention, such as a function, a working mechanism, a related technical term, and a concept, reference may be made to the embodiments shown in FIG. 1 to FIG. 5. The forwarding plane apparatus provided in this embodiment of the present invention may be an OpenFlow-enabled switch.

Figure 9:
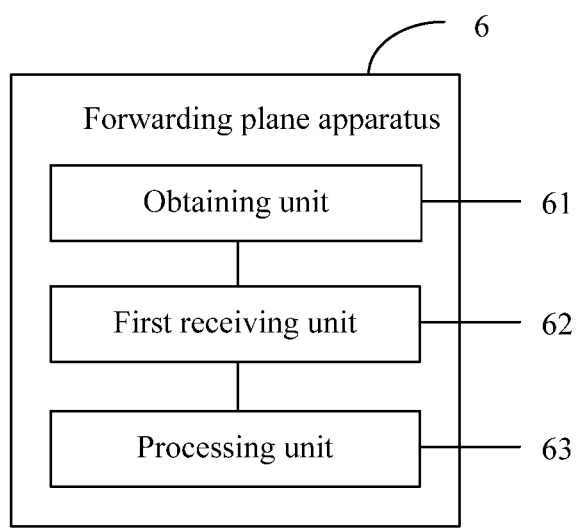
FIG. 9 is a schematic apparatus diagram of a forwarding plane apparatus according to an embodiment of the present invention.

As shown in FIG. 9, the forwarding plane apparatus 6 includes an obtaining unit 61, a first receiving unit 62, and a processing unit 63.

The obtaining unit 61 is configured to obtain a MAC address of an external gateway that is determined by a gateway control plane apparatus and to which a data packet needs to be sent.

The first receiving unit 62 is configured to receive a processing rule sent by the gateway control plane apparatus.

The foregoing processing rule includes the MAC address and is used for instructing to send the data packet to the external gateway, and the external gateway is located in an external network connected to a core network.

The processing unit 63 is configured to process the data packet according to the processing rule received by the first receiving unit 62.

Figure 10:
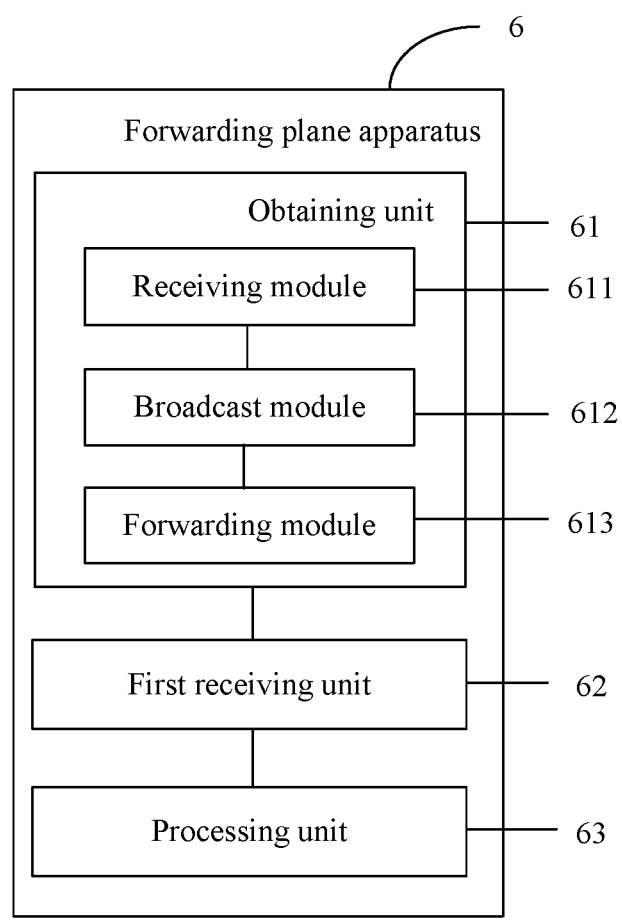
FIG. 10 is a schematic apparatus diagram of another forwarding plane apparatus according to an embodiment of the present invention.

Optionally, as shown in FIG. 10, the obtaining unit 61 further includes: a receiving module 611, a broadcast module 612, and a forwarding module 613.

The receiving module 611 is configured to receive a MAC address request sent by the gateway control plane apparatus.

The foregoing MAC address request includes an IP address of the external gateway and is used for requesting to obtain the MAC address of the external gateway.

The broadcast module 612 is configured to broadcast the MAC address request received by the receiving module 611.

The forwarding module 613 is configured to receive a MAC address request response sent by the external gateway, and send the MAC address request response to the gateway control plane apparatus.

The foregoing MAC address request response includes the MAC address of the external gateway.

Figure 11:
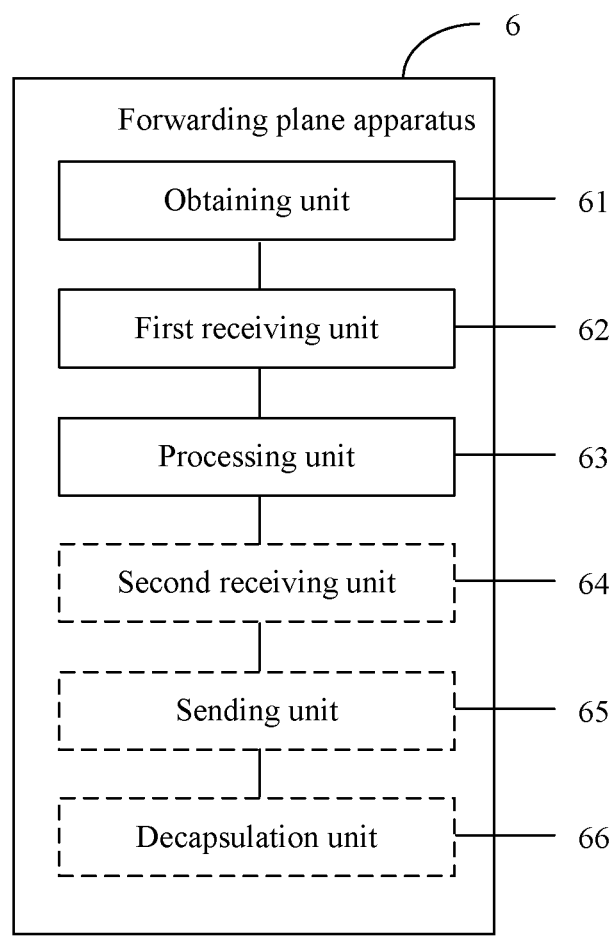
FIG. 11 is a schematic apparatus diagram of still another forwarding plane apparatus according to an embodiment of the present invention.

Optionally, as shown in FIG. 11, the forwarding plane apparatus 6 further includes a second receiving unit 64 and a sending unit 65.

The second receiving unit 64 is configured to receive a GTP packet.

The sending unit 65 is configured to send the GTP packet received by the second receiving unit 64 to the gateway control plane apparatus, so that the gateway control plane apparatus decapsulates the GTP packet to obtain the data packet.

Optionally, as shown in FIG. 11, when the processing rule is further used for instructing to decapsulate the GTP packet, the forwarding plane apparatus 6 further includes:

a decapsulation unit 66, configured to decapsulate the GTP packet according to the processing rule received by the first receiving unit 62, so as to obtain the data packet.

Unit division of the forwarding plane apparatus in this embodiment of the present invention is described as an example, and practically there may have multiple unit division methods to construct the forwarding plane apparatus in this embodiment of the present invention.

According to the forwarding plane apparatus provided in this embodiment of the present invention, after a gateway control plane apparatus determines an external gateway to which a data packet needs to be sent, the forwarding plane apparatus obtains a MAC address of the external network gateway, and sends the MAC address of the external network gateway to the gateway control plane apparatus, so as to process the foregoing data packet according to a processing rule after receiving the processing rule sent by the gateway control plane apparatus, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

A gateway control plane device 7 provided in an embodiment of the present invention may be a hardware entity, or may be implemented by software. Exemplarily, the gateway control plane device may be a control plane device of an SGW, a PGW, or the like, and multiple serving gateway control plane devices may be disposed on one hardware entity. For example, the gateway control plane device may be an OpenFlow-enabled controller. For content such as a specific working principle, interaction with another network element, a related technical term, and a concept that are of the gateway control plane device, reference may be made to the gateway control plane apparatus shown in the embodiment of FIG. 6, FIG. 7, or FIG. 8, and details are not described herein.

Figure 12:
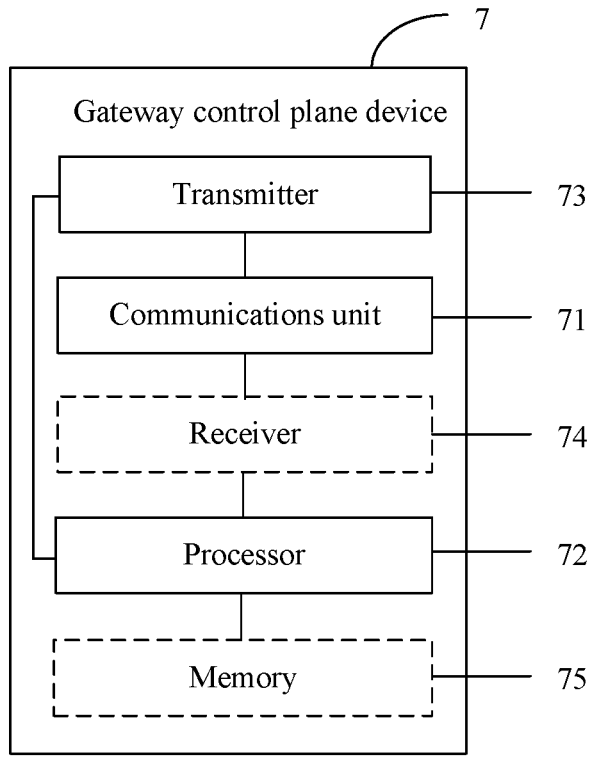
FIG. 12 is a schematic device diagram of a gateway control plane device according to an embodiment of the present invention.

As shown in FIG. 12, the gateway control plane device 7 includes a communications unit 71, a processor 72, and a transmitter 73.

The communications unit 71 is configured to communicate with an external device.

The processor 72 is configured to determine an external gateway to which a data packet needs to be sent, and configured to obtain a MAC address of the external gateway by using a forwarding plane device.

The transmitter 73 is configured to send a processing rule to the forwarding plane device by using the communications unit 71, so that the forwarding plane device processes the data packet according to the processing rule.

The foregoing processing rule includes the MAC address and is used for instructing to send the data packet to the external gateway, and the external gateway is located in an external network connected to a core network.

Optionally, as shown in FIG. 12, the gateway control plane device 7 further includes a receiver 74.

The receiver 74 is configured to receive, by using the communications unit 71, a GTP packet sent by the forwarding plane device.

The processor 72 is further configured to: after the receiver 74 receives the GTP packet sent by the forwarding plane device, decapsulate the GTP packet to obtain the data packet.

Optionally, that the processor 72 determines an external gateway to which a data packet needs to be sent includes: determining, according to a mapping relationship between a destination IP address of a data packet and an IP address of an external gateway, the external gateway to which the data packet needs to be sent.

Optionally, that the processor 72 obtains a MAC address of the external gateway by using a forwarding plane device includes: sending a MAC address request to the forwarding plane device, so that the forwarding plane device broadcasts the MAC address request, where the foregoing MAC address request includes an IP address of the external gateway and is used for requesting to obtain the MAC address of the external gateway; and receiving a MAC address request response sent by the foregoing forwarding plane device, where the MAC address request response includes the MAC address of the external gateway.

Optionally, as shown in FIG. 12, the gateway control plane device 7 further includes a memory 75.

The memory 75 is configured to cache the MAC address of the external gateway.

According to the gateway control plane device provided in this embodiment of the present invention, after determining an external gateway to which a data packet needs to be sent, the gateway control plane device obtains a MAC address of the external network gateway by using a forwarding plane device, so as to send a processing rule to the forwarding plane device, so that the forwarding plane device processes the data packet according to the processing rule, thereby implementing data packet transmission from a mobile core network to an external network, avoiding a packet transmission failure caused because the forwarding plane device cannot learn a MAC address of a next hop, and increasing a success rate of data packet transmission from the mobile core network to the external network.

A forwarding plane device 8 provided in an embodiment of the present invention may be an OpenFlow-enabled switch. For content such as a specific working principle, interaction with another network element, a related technical term, and a concept that are of the forwarding plane device, reference may be made to the forwarding plane apparatus shown in the embodiment of FIG. 9, FIG. 10, or FIG. 11, and details are not described herein.

Figure 13:
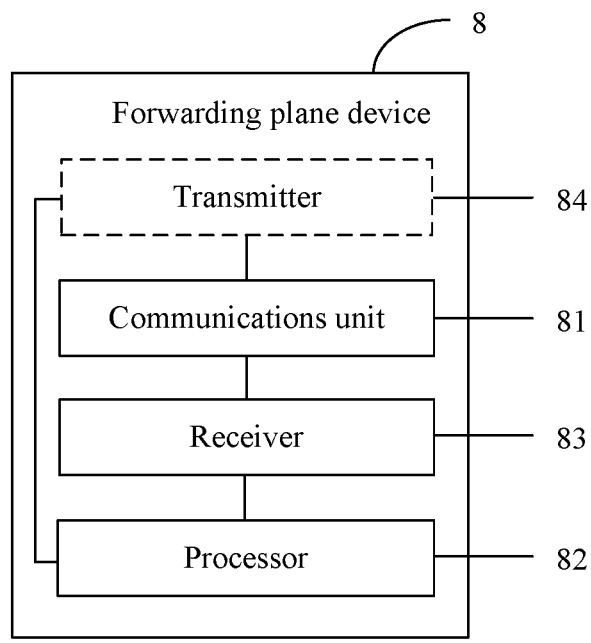
FIG. 13 is a schematic device diagram of a forwarding plane device according to an embodiment of the present invention.

As shown in FIG. 13, the forwarding plane device 8 includes: a communications unit 81, a processor 82, and a receiver 83.

The communications unit 81 is configured to communicate with an external device.

The processor 82 is configured to obtain a MAC address of an external gateway that is determined by a gateway control plane device and to which a data packet needs to be sent.

The receiver 83 is configured to receive, by using the communications unit 81, a processing rule sent by the gateway control plane device.

The foregoing processing rule includes the MAC address and is used for instructing to send the data packet to the external gateway, and the external gateway is located in an external network connected to a core network.

The processor 82 is further configured to process the data packet according to the processing rule.

Optionally, as shown in FIG. 13, the forwarding plane device 8 further includes a transmitter 84.

The transmitter 84 is configured to send a GTP packet to the gateway control plane device by using the communications unit 81, so that the gateway control plane device decapsulates the GTP packet to obtain the data packet.

The receiver 83 is further configured to receive the GTP packet by using the communications unit 81.

Optionally, when the processing rule is further used for instructing to decapsulate the GTP packet, the processor 82 is further configured to decapsulate the GTP packet according to the processing rule, so as to obtain the data packet.

Optionally, that the processor 82 obtains a MAC address of an external gateway that is determined by a gateway control plane device and to which a data packet needs to be sent includes: receiving a MAC address request sent by the gateway control plane device, where the foregoing MAC address request includes an IP address of the external gateway and is used for requesting to obtain the MAC address of the external gateway; broadcasting the foregoing MAC address request, receiving a MAC address request response sent by the foregoing external gateway, and sending the MAC address request response to the foregoing gateway control plane device, where the foregoing MAC address request response includes the MAC address of the external gateway.

According to the forwarding plane device provided in this embodiment of the present invention, after a gateway control plane device determines an external gateway to which a data packet needs to be sent, the forwarding plane device obtains a MAC address of the external network gateway, and sends the MAC address of the external network gateway to the gateway control plane device, so as to process the foregoing data packet according to a processing rule after receiving the processing rule sent by the gateway control plane device, thereby implementing data packet transmission from a mobile core network to an external network, avoiding a packet transmission failure caused because the forwarding plane device cannot learn a MAC address of a next hop, and increasing a success rate of data packet transmission from the mobile core network to the external network.

The gateway control plane apparatus and the forwarding plane apparatus that are provided in the embodiments of the present invention may further form a communications system 9, so as to implement the packet transmission methods provided in the embodiments shown in FIG. 2 to FIG. 5. Exemplarily, as shown in FIG. 14, the communications system 9 includes a gateway control plane apparatus 91 and a forwarding plane apparatus 92, where the gateway control plane apparatus 91 may be the gateway control plane apparatus shown in any one of FIG. 6 to FIG. 8; the forwarding plane apparatus 92 may be the forwarding plane apparatus shown in any one of FIG. 9 to FIG. 11.

Figure 14:
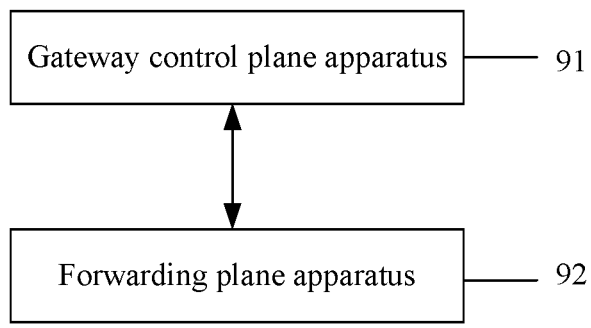
FIG. 14 is a schematic system diagram of a communications system according to an embodiment of the present invention.

As shown in FIG. 14, the communications system 9 includes the gateway control plane apparatus 91 and the forwarding plane apparatus 92 that are located in a core network.

The gateway control plane apparatus 91 is configured to determine an external gateway to which a data packet needs to be sent, obtain a MAC address of the external gateway by using the forwarding plane apparatus 92, and send a processing rule to the forwarding plane apparatus 92.

The foregoing processing rule includes the MAC address and is used for instructing to send the data packet to the external gateway, and the external gateway is located in an external network connected to the core network.

The forwarding plane apparatus 92 is configured to obtain the MAC address of the external gateway for the gateway control plane apparatus 91 and process the data packet according to the processing rule.

Optionally, the forwarding plane apparatus 92 is further configured to receive a GTP packet and send the GTP packet to the gateway control plane apparatus 91.

The gateway control plane apparatus 91 is further configured to decapsulate the GTP packet to obtain the data packet.

Optionally, when the foregoing processing rule is further used for instructing to decapsulate the GTP packet, the forwarding plane apparatus 92 is further configured to decapsulate the GTP packet according to the processing rule, so as to obtain the data packet.

Optionally, the gateway control plane apparatus 91 is configured to determine, according to a mapping relationship between a destination IP address of a data packet and an IP address of an external gateway, the external gateway to which the data packet needs to be sent.

Optionally, the gateway control plane apparatus 91 is configured to send a MAC address request to the forwarding plane apparatus 92, so that the forwarding plane apparatus 92 broadcasts the MAC address request.

The foregoing MAC address request includes an IP address of the external gateway and is used for requesting to obtain the MAC address of the external gateway.

The forwarding plane apparatus 92 is configured to broadcast the MAC address request, receive a MAC address request response sent by the external gateway, and send the MAC address request response to the gateway control plane apparatus 91.

The foregoing MAC address request response includes the foregoing MAC address of the external gateway.

Optionally, the gateway control plane apparatus 91 is further configured to cache the MAC address of the external gateway.

According to the communications system provided in this embodiment of the present invention, after determining an external gateway to which a data packet needs to be sent, a gateway control plane apparatus obtains a MAC address of the external network gateway by using a forwarding plane apparatus, so as to send a processing rule to the forwarding plane apparatus, so that the forwarding plane apparatus processes the data packet according to the processing rule, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

The gateway control plane device and the forwarding plane device that are provided in the embodiments of the present invention may further form a communications system, so as to implement the packet transmission methods provided in the embodiments shown in FIG. 2 to FIG. 5. Exemplarily, as shown in FIG. 15, the communications system S10 includes a gateway control plane device S101 and a forwarding plane device S102, where the gateway control plane device S101 may be the gateway control plane device shown in FIG. 12; the forwarding plane device S102 may be the forwarding plane device shown in FIG. 13.

Figure 15:
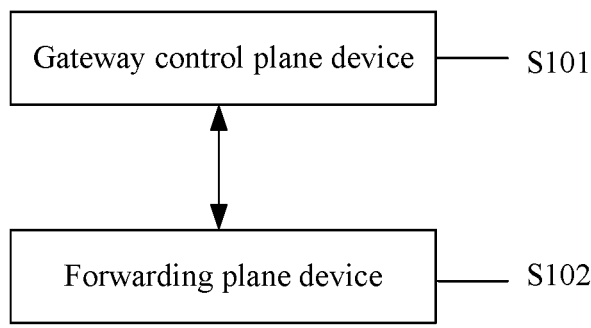
FIG. 15 is a schematic system diagram of another communications system according to an embodiment of the present invention.

As shown in FIG. 15, the communications system S10 includes the gateway control plane device S101 and the forwarding plane device S102 that are located in a core network.

The gateway control plane device S101 is configured to determine an external gateway to which a data packet needs to be sent, obtain a MAC address of the external gateway by using the forwarding plane device S102, and send a processing rule to the forwarding plane device S102.

The foregoing processing rule includes the MAC address and is used for instructing to send the data packet to the external gateway, and the external gateway is located in an external network connected to the core network.

The forwarding plane device S102 is configured to obtain the MAC address of the external gateway for the gateway control plane device S101 and process the data packet according to the processing rule.

Optionally, the forwarding plane device S102 is further configured to receive a GTP packet and send the GTP packet to the gateway control plane device S101.

The gateway control plane device S101 is further configured to decapsulate the GTP packet to obtain the data packet.

Optionally, when the foregoing processing rule is further used for instructing to decapsulate the GTP packet, the forwarding plane device S102 is further configured to decapsulate the GTP packet according to the processing rule, so as to obtain the data packet.

Optionally, the gateway control plane device S101 is configured to determine, according to a mapping relationship between a destination IP address of a data packet and an IP address of an external gateway, the external gateway to which the data packet needs to be sent.

Optionally, the gateway control plane device S101 is configured to send a MAC address request to the forwarding plane device S102, so that the forwarding plane device S102 broadcasts the MAC address request.

The foregoing MAC address request includes an IP address of the external gateway and is used for requesting to obtain the MAC address of the external gateway.

The forwarding plane device S102 is configured to broadcast the MAC address request, receive a MAC address request response sent by the external gateway, and send the MAC address request response to the gateway control plane device S101.

The foregoing MAC address request response includes the foregoing MAC address of the external gateway.

Optionally, the gateway control plane device S101 is further configured to cache the MAC address of the external gateway.

According to the communications system provided in this embodiment of the present invention, after determining an external gateway to which a data packet needs to be sent, a gateway control plane apparatus obtains a MAC address of the external network gateway by using a forwarding plane apparatus, so as to send a processing rule to the forwarding plane apparatus, so that the forwarding plane apparatus processes the data packet according to the processing rule, thereby implementing data packet transmission from a mobile core network to an external network, avoiding a packet transmission failure caused because the forwarding plane apparatus cannot learn a MAC address of a next hop, and increasing a success rate of data packet transmission from the mobile core network to the external network.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

In addition, functional units in the devices and systems in the embodiments of the present invention may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A communications system for communicating with an external gateway, the communication system comprising a forwarding plane apparatus and a gateway control plane apparatus, wherein the forwarding plane apparatus and the gateway control plane apparatus are located in a core network, and the external gateway is located in an external network connected to the core network, wherein the gateway control plane apparatus is configured to perform operations of:
receiving, from the forwarding plane apparatus, a general packet radio service tunneling protocol (GTP) packet including a data packet;
decapsulating the GTP packet to obtain the data packet;
determining the external gateway to which the data packet needs to be sent,
obtaining, using a media access control (MAC) address request to the forwarding plane apparatus, a MAC address of the external gateway, and
sending, after receiving the MAC address of the external gateway in a MAC address request response from the forwarding plane apparatus, a processing rule to the forwarding plane apparatus, wherein the processing rule:
comprises the MAC address of the external gateway, and
instructs the forwarding plane to send the data packet to the external gateway; and wherein the forwarding plane apparatus is configured to perform operations of:
receiving the GTP packet including the data packet;
sending the GTP packet to the gateway control plane apparatus without decapsulating the GTP packet;
obtaining, in accordance with the MAC address request from the gateway control plane apparatus, the MAC address of the external gateway;
sending a MAC address request response, which contains the MAC address of the external gateway, to the gateway control plane apparatus;
receiving, after sending the MAC address request response, the processing rule containing the MAC address of the external gateway, from the gateway control plane apparatus; and
processing the data packet according to the processing rule.

2. The system according to claim 1, wherein:
the processing rule is further used for instructing to decapsulate the GTP packet; and
the forwarding plane apparatus is further configured to decapsulate the GTP packet according to the processing rule, so as to obtain the data packet.

3. The system according to claim 1, wherein:
the gateway control plane apparatus is configured to determine, according to a mapping relationship between a destination IP address of the data packet and an IP address of the external gateway, the external gateway to which the data packet needs to be sent.

4. The system according to claim 1, wherein:
the gateway control plane apparatus is configured to send a MAC address request to the forwarding plane apparatus, so that the forwarding plane apparatus broadcasts the MAC address request, wherein the MAC address request comprises an IP address of the external gateway and is used for requesting to obtain the MAC address of the external gateway; and the forwarding plane apparatus is configured to broadcast the MAC address request, receive a MAC address request response sent by the external gateway, and send the MAC address request response to the gateway control plane apparatus, wherein the MAC address request response comprises the MAC address of the external gateway.

5. The system according to claim 1, wherein:
the gateway control plane apparatus is further configured to cache the MAC address of the external gateway.

* * * * *